(12) United States Patent
Yasumatsu et al.

(10) Patent No.: US 7,094,513 B2
(45) Date of Patent: *Aug. 22, 2006

(54) CHARGE CONTROL AGENT AND TONER FOR ELECTROSTATIC IMAGE DEVELOPMENT

(75) Inventors: Masashi Yasumatsu, Neyagawa (JP); Kazuyoshi Kuroda, Neyagawa (JP); Osamu Yamate, Neyagawa (JP); Kaori Sato, Neyagawa (JP); Jun Hikata, Neyagawa (JP); Heihachi Yushina, Neyagawa (JP)

(73) Assignee: Orient Chemical Industries, Ltd., Osaka (JP)

( * ) Notice: Subject to any disclaimer, the term of this patent is extended or adjusted under 35 U.S.C. 154(b) by 189 days.

This patent is subject to a terminal disclaimer.

(21) Appl. No.: 10/718,637

(22) Filed: Nov. 24, 2003

(65) Prior Publication Data

US 2005/0250034 A1    Nov. 10, 2005

(30) Foreign Application Priority Data

Dec. 6, 2002    (JP) .............................. 2002-355598

(51) Int. Cl.
*G03G 9/087* (2006.01)
(52) U.S. Cl. .................. 430/108.23; 430/120
(58) Field of Classification Search .......... 430/108.21, 430/108.22, 108.23, 120
See application file for complete search history.

(56) References Cited

U.S. PATENT DOCUMENTS

| | | | | |
|---|---|---|---|---|
| 6,365,314 B1 * | 4/2002 | Tomiyama et al. | .... | 430/108.23 |
| 6,548,648 B1 * | 4/2003 | Yasumatsu et al. | ......... | 534/602 |
| 2003/0003387 A1 * | 1/2003 | Xu et al. | ............... | 430/137.14 |

FOREIGN PATENT DOCUMENTS

| | | |
|---|---|---|
| EP | 0 180 655 | 5/1988 |
| EP | 0 314 459 | 5/1989 |
| EP | 0 461 672 | 12/1991 |
| EP | 0 468 525 | 1/1992 |
| EP | 0 572 896 | 12/1993 |
| EP | 0 621 512 | 10/1994 |
| EP | 0 621 513 | 10/1994 |
| EP | 0 650 097 | 4/1995 |
| EP | 0 677 794 | 10/1995 |
| EP | 0 686 883 | 12/1995 |
| EP | 0 701 177 | 3/1996 |
| JP | 58-111049 | 7/1983 |
| JP | 61-155464 | 7/1986 |

* cited by examiner

*Primary Examiner*—John L Goodrow
(74) *Attorney, Agent, or Firm*—Steptoe & Johnson LLP

(57) ABSTRACT

A charge control agent of the present invention comprises aggregate particles of an azo-type iron complex salt represented by the following chemical formula [I]

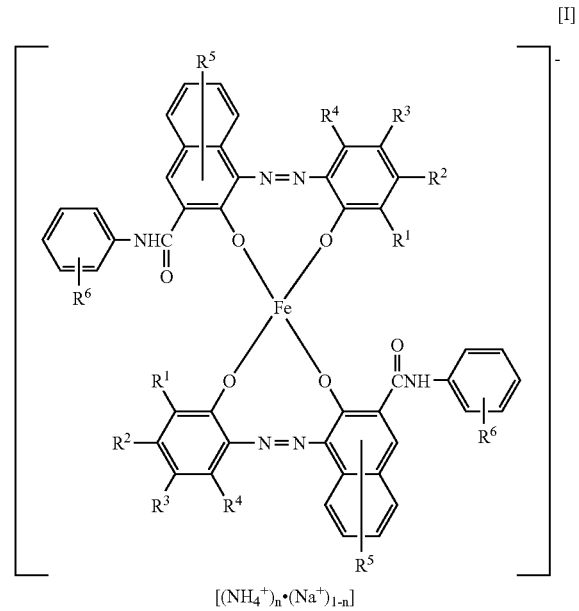

in the chemical formula [I], $R^1$—, $R^2$—, $R^3$—, $R^4$—, $R^5$— and $R^6$— are same or different to each other, n is 0.7 to 0.99, the aggregate particles have an average particle size of 1 to 4 microns and an average particle size of a primary particulate crystalline, that is fined the aggregate particles with ultrasonic irradiation, is at most 3 microns. A toner for developing an electrostatic image comprises a resin for the toner and the charge control agent.

11 Claims, 2 Drawing Sheets

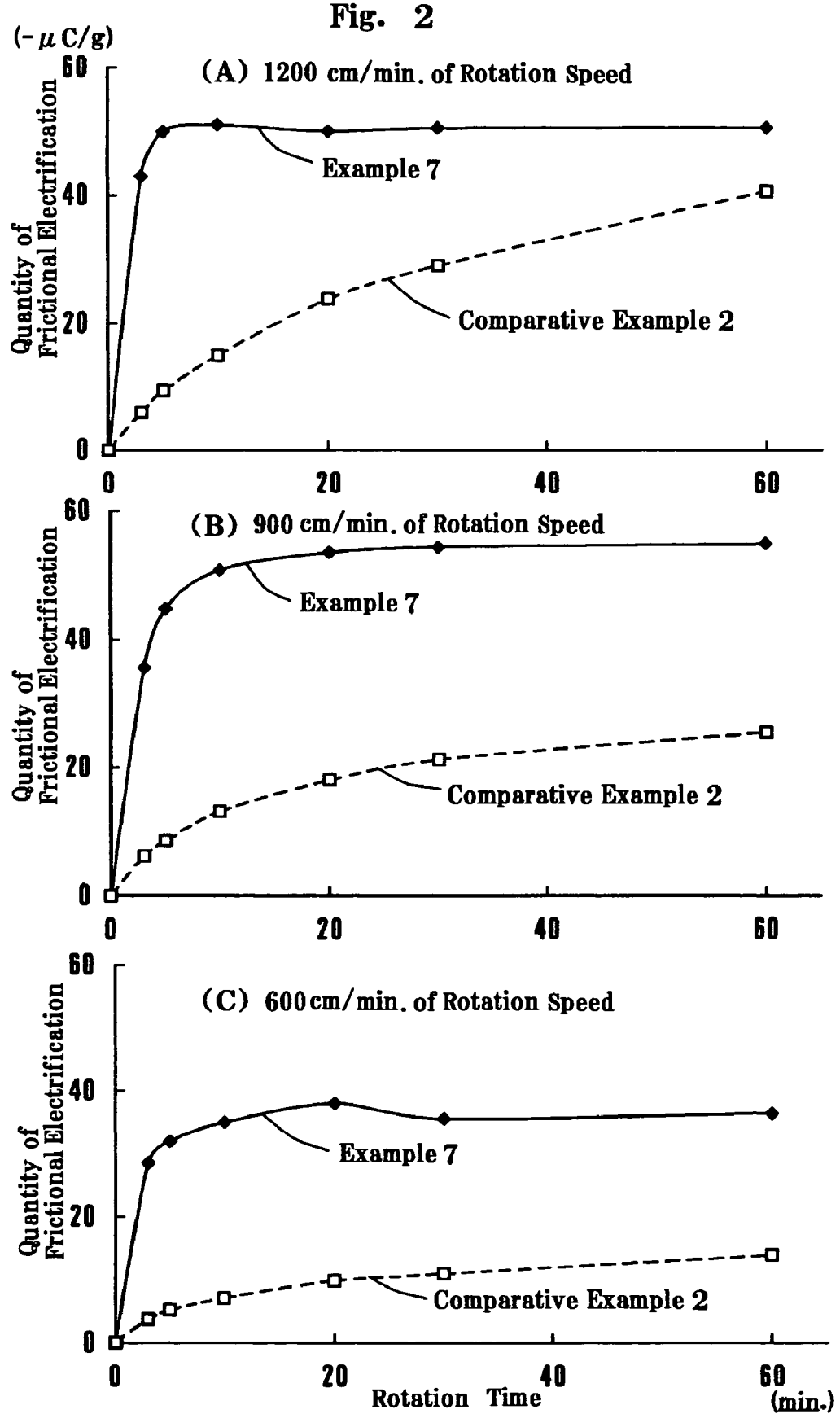

CHARGE CONTROL AGENT AND TONER FOR ELECTROSTATIC IMAGE DEVELOPMENT

BACKGROUND OF THE INVENTION

This invention relates to a negative charge control agent including azo-type iron complexes which is used for a toner for an electrostatic image development or a powder paint and the toner for an electrostatic image development including the agent.

An electro photography system applied to a copy machine, printer or facsimile performs to develop an electrostatic latent image on photosensitive frame by toner having frictional electrification and the imaged toner to transfer and then fix onto a paper.

A charge control agent is added to the toner beforehand so as for the toner to quicken a rise speed of the electrification, electrify sufficiently, control a proper quantity of the electrification stably, improve electrification property, rise up a speed for developing the electrostatic latent image, and form the vivid images. For instance, as the negative charge control agent, metallic complex salts are mentioned in Japanese Patent Provisional Publication No. 61-155464.

In recent year, a copy machine or printer causes high efficiency with improving resolution and so on. The electro photography system is used with not only a high speed development but also a low speed development in widespread purposes. Therefore, it is required that the charge control agent causes faster rise speed of the electrification of the toner, more excellent electrification property, the agent is able to form the vivid images of high resolution, and the agent is able to be manufactured simply. And it is required that the charge control agent is able to be used of a powder paint for a electrostatic powder printing method which attracts and bakes the powder paint onto a surface of a frame work having charge.

SUMMARY OF THE INVENTION

The present invention has been developed to solve the foregoing problems.

It is an object of the present invention to provide the charge control agent manufactured simply, and its manufacturing method. The charge control agent causes the fast rise speed of the electrification, excellent electrification property, making to form the vivid images of high resolution. It is another object of the present invention to provide the toner for electrostatic image development including this agent, and the images formation method used this toner.

The charge control agent of the present invention developed for accomplishing the foregoing object, comprises aggregate particles of an azo-type iron complex salt represented by the following chemical formula [I]

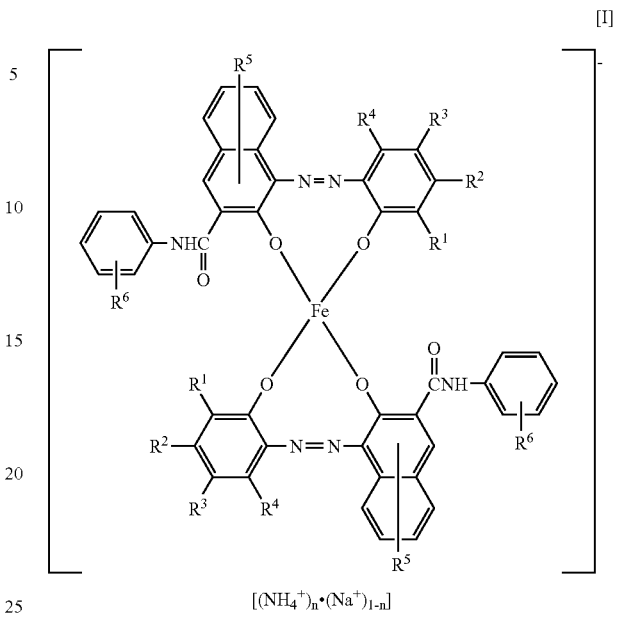

in the chemical formula [I], $R^1-$, $R^2-$, $R^3-$ and $R^4-$ are same or different to each other, and one thereof is selected from the groups consisting of a hydrogen atom, an alkyl group having a straight or branch chain of 1 to 18 carbon atoms, an alkenyl group having a straight or branch chain of 2 to 18 carbon atoms, a sulfonamide group being to have substitutional groups, a mesyl group, a hydroxyl group, an alkoxyl group of 1 to 18 carbon atoms, an acetylamino group, a benzoylamino group, a halogen atom, a nitro group and an aryl group being to have substitutional groups; $R^5-$ is a hydrogen atom, an alkyl group having a straight or branch chain of 1 to 18 carbon atoms, a hydroxyl group or an alkoxyl group of 1 to 18 carbon atoms; $R^6-$ is a hydrogen atom, an alkyl group having a straight or branch chain of 1 to 18 carbon atoms, a hydroxyl group, a carboxyl group, a halogen atom or an alkoxyl group of 1 to 18 carbon atoms; n is 0.7 to 0.99, the aggregate particles have an average particle size of 1 to 4 microns and an average particle size of a primary particulate crystalline, that is fined the aggregate particles with ultrasonic irradiation, is at most 3 microns.

Since the charge control agent is fine, it is unnecessary to grind using a powerful pulverization equipment like a jet mill. When a toner for electrostatic image development of the several micrometers particle size, that is prepared by melt-kneading the charge control agent of fine aggregate particles within this range of average particle size and the resin for the toner, is magnified with a scanning electron microscope, it is observed that the charge control agent is dispersed homogeneously into the particles of the toner. Consequently the toner, whose the charge control agent is exposed sufficiently on the surface thereof, causes the equal and excellent electrification property. If the average particle size of the aggregate particles of the charge control agent is more than 4 microns, the toner causes decreasing the dispersibility and electrification property thereof. It is preferable that the charge control agent comprises the aggregate particles whose average particle size ranges from 1 to 3 microns.

It is preferable that a size of a primary particle of said azo-type iron complex salt represented by the above chemical formula [I] is at most 4 microns.

It is guessed that the charge control agent of the aggregate particles having the average particle size of 1 to 4 microns are formed by association of several superfine primary particles. If the fined primary particles are larger than the above range, the average particle size of the charge control agent of the aggregate particles associated with equal number of the primary particles is more than 4 microns.

The toner for electrostatic image development prepared with the charge control agent, that comprises the azo-type iron complex salt having the counter ions of above ratio of the ammonium ion and the sodium ion, causes fast rise speed of the electrification under the high and low speed development of the electrostatic latent image. Further the toner causes electrifying sufficient quantity of charge and keeping stable electrification. If n is out of the above range, the toner causes a lower rise speed of the electrification under the lower speed development of the electrostatic latent image, and the toner causes electrifying insufficient quantity of charge.

A common main skeleton of the azo-type iron complex salt is represented by the following structural formula [IV]:

[IV]

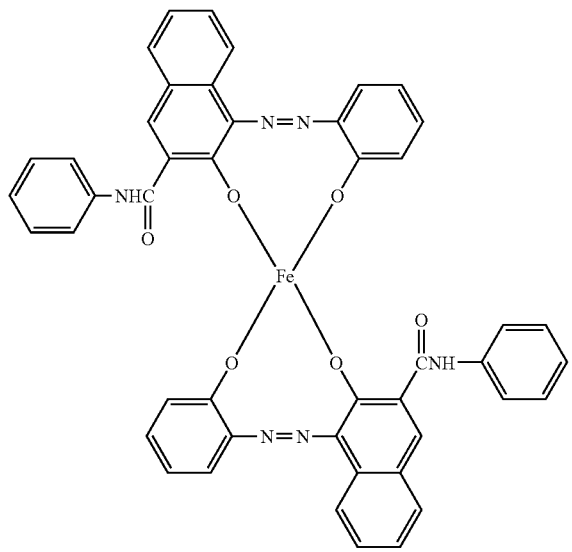

The skeleton has a central metal of an iron atom, and a metal-chelating structure with 2 molar equivalents of the monoazo compound and 1 molar equivalent of iron atom. The monoazo compound has a naphthalene ring. A hydrogen atom of the naphthalene ring is substituted by an anilide group represented by the following group [V]:

[V]

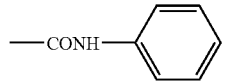

Each of the monoazo compounds having the naphthalene ring substituted by the anilide group and the azo-type iron complex salt derived from thereof improve oil insolubility.

It is difficult to prepare the azo-type iron complex salt by reason of tendency to react among solids. And the salt is difficult to crystallize. Further the salt tends to disperse heterogeneously by reason of lowering of compatibility with the toner resin. For obtaining the toner having excellent charge controlling property and well developing property, it is important that the azo-type iron complex salt is still finer particle, and dispersed homogeneously.

The azo-type iron complex salts represented by the above chemical formula [I] are as follows.

$R^1$—, $R^2$—, $R^3$— and $R^4$— are same or different to each other, and one thereof is selected from the groups consisting of the hydrogen atom; the alkyl group having the straight or branch chain of 1 to 18 carbon atoms such as methyl group, ethyl group, propyl group, isopropyl group, n-butyl group, tert-butyl group, n-pentyl group, isopentyl group, hexyl group, heptyl group or octyl group; the alkenyl group having the straight or branch chain of 2 to 18 carbon atoms such as vinyl group, allyl group, propenyl group or butenyl; the sulfonamide group being to have substitutional groups; the mesyl group; the hydroxyl group; the alkoxyl group having 1 to 18 carbon atoms such as methoxyl group, ethoxyl group, propoxyl group; the acetylamino group; the benzoylamino group; the halogen atom such as fluorine atom, chlorine atom or bromine atom; the nitro group; the aryl group being to have substitutional groups such as phenyl group or naphthyl group which may have a few substitutional groups such as hydroxyl group, alkyl group, aryl group or halogen atom for example fluorine atom, chlorine atom, bromine atom.

$R^5$— is selected from the groups consisting of the hydrogen atom; the alkyl group having the straight or branch chain of 1 to 18 carbon atoms such as methyl group, ethyl group, propyl group, isopropyl group, n-butyl group, tert-butyl group, n-pentyl group, isopentyl group, hexyl group, heptyl group or octyl group; the hydroxyl group and the alkoxyl group of 1 to 18 carbon atoms such as methoxyl group, ethoxyl group, propoxyl group.

$R^6$— is selected from the groups consisting of the hydrogen atom; the alkyl group having the straight or branch chain of 1 to 18 carbon atoms such as methyl group, ethyl group, propyl group, isopropyl group, n-butyl group, tert-butyl group, n-pentyl group, isopentyl group, hexyl group, heptyl group or octyl group; the hydroxyl group; the carboxyl group; the halogen atom; and the alkoxyl group of 1 to 18 carbon atoms such as methoxyl group, ethoxyl group, propoxyl group.

It is preferable that the azo-type iron complex salt represented by the above chemical formula [I] is a compound represented by the following chemical formula [II]:

[II]

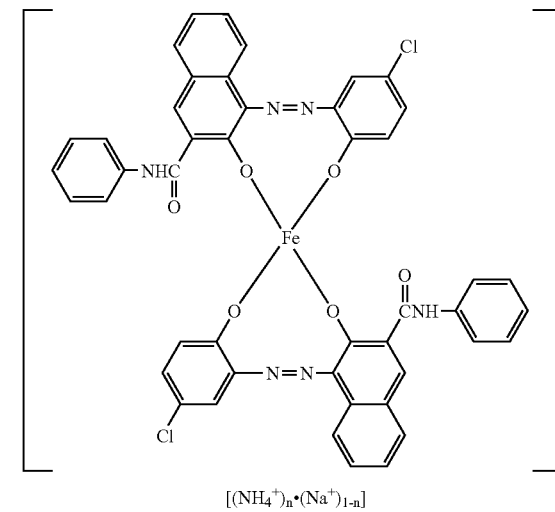

$[(NH_4^+)_n \cdot (Na^+)_{1-n}]$ (in the chemical formula [II], n is same above)

The azo-type iron complex salt represented by the following chemical formula [I] may be other compounds represented by the following chemical formulae [VI]–[XIII], wherein n is same above.

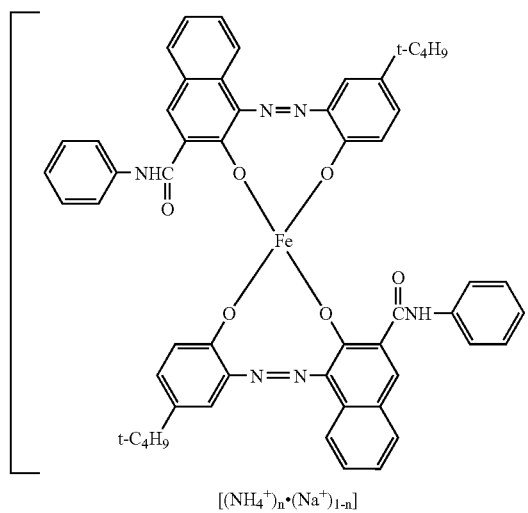

[VI]

$[(NH_4^+)_n \bullet (Na^+)_{1-n}]$ (in the chemical formula [VI], t-C$_4$H$_9$— is a tertiary butyl group)

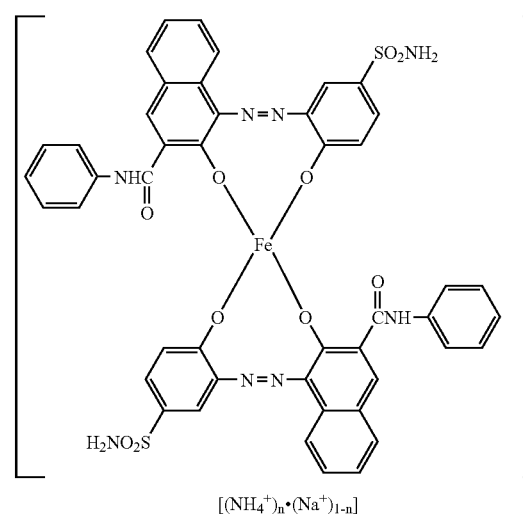

[VII]

$[(NH_4^+)_n \bullet (Na^+)_{1-n}]$

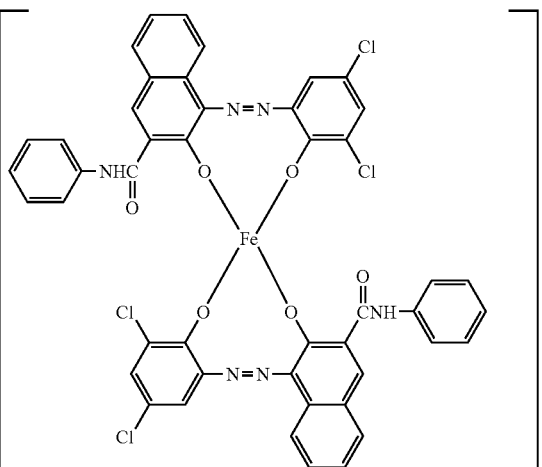

[VIII]

$[(NH_4^+)_n \bullet (Na^+)_{1-n}]$

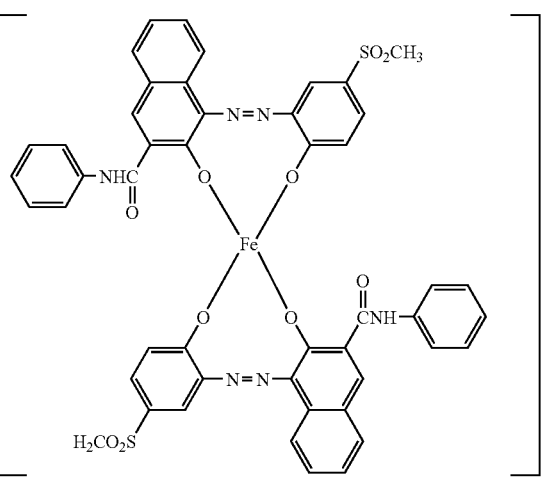

[IX]

$[(NH_4^+)_n \bullet (Na^+)_{1-n}]$

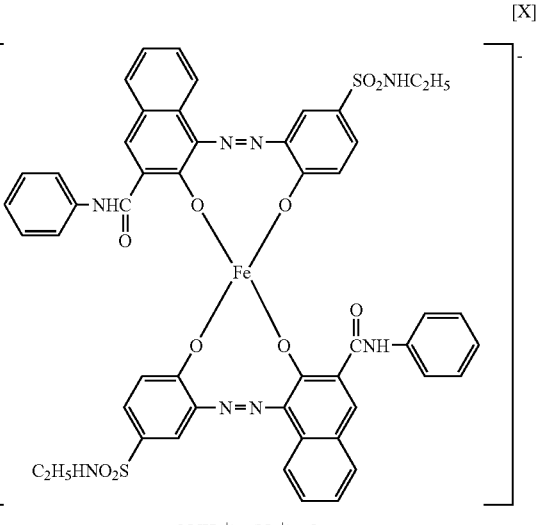

[X]

$[(NH_4^+)_n \bullet (Na^+)_{1-n}]$

-continued

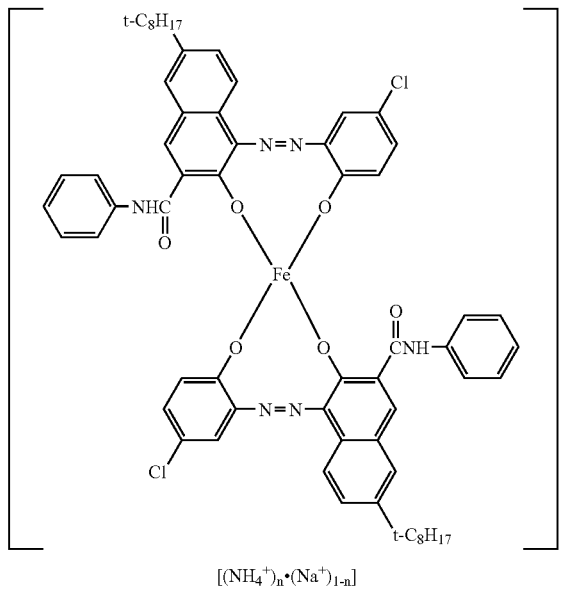

[XI]

[(NH$_4^+$)$_n$•(Na$^+$)$_{1-n}$]

(in the chemical formula [XI], t-C$_8$H$_{17}$— is a tertiary octyl group)

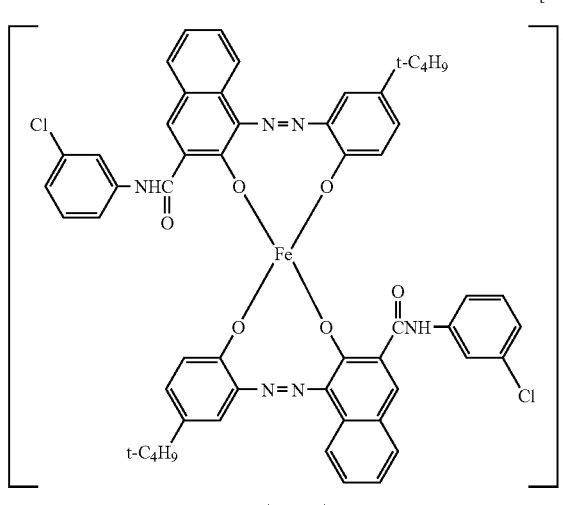

[XII]

[(NH$_4^+$)$_n$•(Na$^+$)$_{1-n}$]

-continued

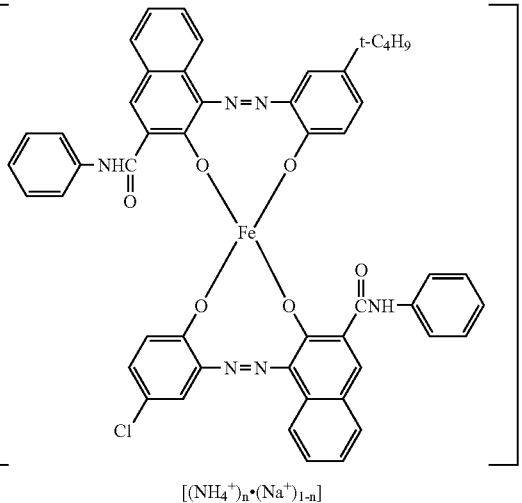

[XIII]

[(NH$_4^+$)$_n$•(Na$^+$)$_{1-n}$]

Especially, the compound represented by the above-mentioned chemical formula [II] is desirable.

When the charge control agent is magnified with the scanning electron microscope, it is observed that it comprises the aggregate particles having the above size and almost uniform platy-shape. And it is observed that the almost uniform platy-shape of the aggregate particles has about 2 to 5 microns in length and about 0.5 to 1 microns in width. Since the toner comprising the uniform charge control agent causes homogeneous electrification property, the electrostatic latent images are formed evenly and vividly.

According to investigation upon the average particle size of the primary particulate crystalline of the charge control agent and the surface area of the primary particle, it is preferable that the specific surface area determined from said average particle size of the primary particulate crystalline is at least 10 m$^2$/g. Within this range, the charge control property of the charge control agent improves, to obtain the images having high resolution. It is more preferable that the specific surface area is at least 15 m$^2$/g.

It is preferable that the charge control agent further comprises butanol of an amount of 0.01 to 1.00% by weight. When the charge control agent is prepared using butanol, the average particle size thereof is fine. It is guess that the excellent toner is prepared, because the charge control agent comprising small amount of butanol is difficult to aggregate and easy to disperse into the toner finely.

The charge control agent has allowable residual chloride ion wherein an amount thereof is at most 200 ppm preferably. Further the charge control agent has allowable residual sulfate ion wherein an amount thereof is at most 100 ppm preferably. The amounts of the ion are measured as the residual ions of the azo-type iron complex salt. The charge control agent having higher purity improves the electrification property more.

The method for manufacturing the charge control agent comprising the azo-type iron complex salt represented by the above chemical formula [I] of the present invention, comprises steps of:

a diazotization coupling reaction first-step for preparing the monoazo compound represented by the following chemical formula [III]

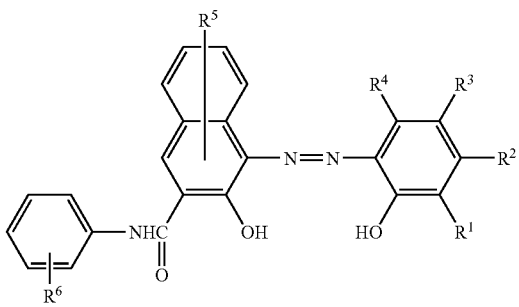

(in the chemical formula [III], $R^1$—, $R^2$—, $R^3$—, $R^4$—, $R^5$—, and $R^6$— are same above):

a second-step for iron-complexing with said monoazo compound:

a counter ion-exchanging third-step for preparing an azo-type iron complex salt represented by above-mentioned formula [I]: and a fourth-step for filtrating and drying the azo-type iron complex salt:

at least one of said second-step for iron-complexing and said counter ion-exchanging third-step carries out in mixed solvent of water and the lower alcohol having 1 to 6 carbon atoms. It is preferable that the water is included at least 70% by weight thereof.

According to the method for manufacturing, the prepared monoazo compound and the azo-type iron complex salt are easy to crystallize. In the each steps of the method, the reactants and the products are controlled to fine. Thus controlling is an influential factor to prepare the charge control agent comprising aggregate particles of the azo-type iron complex salt and the primary particulate crystalline thereof in good yield. In the method for manufacturing, the reaction is carried out in the mixed aqueous solvent including the lower alcohol having 1 to 6 carbon atoms, to control the particulate crystalline of the azo-type iron complex salt fine in high yield. It is more preferable that the lower alcohol is butanol.

It is preferable that the first-step carries out preparing monoazo compound by general procedures of the diazotization coupling reaction in water, mixed solvent of water and organic solvent, or especially mixed solvent of water and the lower alcohol having 1 to 6 carbon atoms.

It is preferable that the second-step carries out iron-complexing with the monoazo compound prepared in the first-step, by an iron-complexing agent such as ferric sulfate, ferric chloride or ferric nitrate, in water, mixed solvent of water and the organic solvent, or especially mixed solvent of water and the lower alcohol having 1 to 6 carbon atoms which has a ratio by weight of 99.9 to 70 parts water to 0.1 to 30 parts the lower alcohol having 1 to 6 carbon atoms. The reaction is carried out in the aqueous mixed solvent including the lower alcohol having 1 to 6 carbon atoms, to control the average particle size of the charge control agent. In the second step, the mixed solvent includes the lower alcohol having 1 to 6 carbon atoms of 0.5 to 9.0% by weight, especially 2.0 to 8.0% by weight. It is preferable that the lower alcohol is butanol.

It is preferable that the third-step carries out counter ion-exchanging by an ammonium compound such as aqueous ammonia, ammonium nitrate, ammonium phosphate, ammonium chloride or ammonium sulfate.

After the second-step for iron-complexing with the monoazo compound, the third-step for counter ion-exchanging may be carried out. The second-step and the third-step may be carried out simultaneously.

On counter ion-exchanging, the whole counter ion derives $Na^+$ or $H^+$, and then this counter ion may be exchanged by the ion represented by the above-mentioned chemical formula [I], to have the desired ratio n.

The ion-exchanging procedure is carried out in at least one of aqueous solvent and nonaqueous solvent. The aqueous solvent is inexpensive. Using the aqueous solvent, the reactants and the products are easy to crystallize, and controlled the particle size of the crystalline thereof fine.

Any continuous steps of the first-, second-, or third-step may be carried out in the same reactor. Each step thereof may be carried out in the separate reactors. Each step thereof may be carried out through one-pot operation without removing the solvent.

Whenever completing the reaction of each step, intermediate products may be filtrated out to obtain a wet cake, and then the cake may be dried to obtain a dry cake. The wet or dry cake may be used for next steps as the intermediate.

A crucial procedure in the method wherein after the first-step the reaction mixture is taken out and filtrated to obtain the intermediate products of the wet cake, is regulation of the desired amount of the counter ion $Na^+$ of the product of the azo-type iron complex salt. So it is necessary to determine the amount of $Na^+$ of the reaction mixture prepared by the diazotization coupling reaction using for instance sodium nitrite in the first-step, and the residual amount of $Na^+$ of the monoazo compound. The amount of sodium hydroxide is regulated by subtraction of the residual amount of $Na^+$ of the monoazo compound. In the second-step, the sodium hydroxide is added to the mixed solvent of water and the lower alcohol having 1 to 6 carbon atoms dispersing the monoazo compound, and then the iron-complexing agent is added thereto. By the iron-complexing reaction, the azo-type iron complex salt having the desired ratio of the counter ion is prepared simply. In this reaction, it is preferable that pH is 2 to 4.

The manufactured charge control agent has fine particle size and uniform shape. So the charge control agent is unnecessary to pulverize and classify. The method for manufacturing the charge control agent is simply and practically.

If the amount of sodium hydroxide, the amount of the lower alcohol having 1 to 6 carbon atoms and pH are out of above appropriate ranges, the average particle size of the charge control agent is over 4 microns. If such charge control agent is crushed with weak force by an agitator mill, a mortar and so on, the average particle size thereof is out of 1 to 4 microns. And it is necessary to pulverize under high-speed flow such as a jet mill.

In the method wherein the second-step is carried out after the first-step without taking out the reaction mixture, if the amount of the lower alcohol having 1 to 6 carbon atoms is out of above appropriate ranges, the average particle size of the charge control agent is over 4 microns. If such charge control agent is crushed with weak force by the agitator mill, the mortar and so on, the average particle size thereof is out of 1 to 4 microns. And it is necessary to pulverize under high-speed flow such as the jet mill.

The manufactured charge control agent is dried, to form aggregated lumps of about 1 mm to several cm by static electricity and so on. The lumps are crushed with a crusher such as the agitator mill or the mortar, to be the aggregate particles having the size of 1 to 4 microns easily. The aggregate particles, which are carried out just crushing of the weak pulverization procedure, have fine particle size and uniform shape. The aggregate particles have high and stable quality.

It is preferable that the charge control agent is manufactured from this method for manufacturing to come in useful.

The charge control agent is used for including into the toner for electrostatic image development or the powder paint.

The toner for developing the electrostatic image of the present invention comprises the above-mentioned charge control agent and the resin for the toner. Examples of the resin for the toner are a stylene resin, an acrylic resin, an epoxy resin, a vinyl resin and a polyester resin. The toner may comprise colorant, a magnetic material, a fluid improvement agent or an offset prevention agent. The toner may comprise the resin for the toner having high acid value to use for high-speed instruments. It is preferable that the acid value is 20 to 100 mgKOH/g.

The toner comprises, for example 100 parts by weight of the resin for the toner, 0.1 to 10 parts by weight of the charge control agent, and 0.5 to 10 parts by weight of the colorant.

The copied image using the negative electrified toner by the friction is vivid and high quality. The toner causes the faster rise speed of the electrification thereof. So the toner develops the electrostatic latent image clearly and forms vivid images of high resolution, not only under high speed copying but also under low speed copying at rotating speed of at most 600 cm/min. The toner has the excellent copying property.

As the colorant in the toner, known various dyestuffs or pigments are used. Examples of colorant are organic pigments such as quinophtharone yellow, isoindolinone yellow, perinone orange, perinone red, perylene maroon, rhodamine 6G lake, quinacridone red, anthanthrone red, rose bengale, copper phthalocyanine blue, copper phthalocyanine green and diketopyrrolopyrrole; inorganic pigments such as carbon black, titanium white, titanium yellow, ultramarine, cobalt blue, red iron oxide, aluminum powder, bronze; metal powder. And examples of colorant are dyestuffs or pigments treated with higher fatty acids, synthetic resins. The exemplified colorant may be used solely or plurally with mixing.

For improving the quality of the toner, the additive agents may be added to the toner internally or externally. Examples of the additive agents are the offset prevention agent; the fluid improvement agent such as magnesium fluoride and various metal oxides for example silica, aluminum oxide, titanium oxide; a cleaning auxiliary such as a metallic soap for example stearic acid, particulates of various synthetic resin for example fluorine-contained resin particulates, silicone synthetic resin particulates, stylene-(meth)acrylic synthetic resin particulates, and so on.

After the toner is mixed with carrier powder, it is used for developing by a two-component magnetic brush development method and so on. The carrier powder can be used all known carrier powder, and is not limited especially. Examples of the carrier powder are the powder of iron or nickel or ferrite whose particle size is ranging from 50 to 200 microns generally, glass beads, the modified powder or beads whose surfaces are coated with an acrylate copolymer, a styrene-acrylate copolymer, a styrene-acrylate copolymer, a silicone resin, a polyamide resin or a fluoroethylene-contained resin, and so on.

The toner is used for the mono-component development method. On the occasion of the above-mentioned preparing of the toner, the toner is prepared with adding and dispersing ferromagnetic particulates such as the powder of iron or nickel or ferrite and so on. Examples of the development methods are a contact development method and a jumping development method.

Example of the method for manufacturing the toner is so-called pulverization method. This method is specifically as follows. The resin, a mold lubricant consisting of a material having low softening point, the colorant, the charge control agent and so on are dispersed homogeneously by a pressurized kneader, a extruder or a media dispersing machine. It is pulverized mechanically, or pulverized by collision with targets under jet flow, to prepare the pulverized toner having the desired particle size. Particle size distribution thereof is narrowed through the classification process, to prepare the desired toner.

Moreover, the method of manufacturing the polymerized toner is as follows, for example. The mold lubricant, the colorant, the charge control agent, a polymerization initiator and the other additive agents are added to a monomer. It is dissolved or dispersed homogeneously by a homomixer, an ultrasonic disperser and so on, to prepare a monomer composition. The monomer composition is dispersed in water phase including a dispersion stabilizer by the homomixer and so on. When droplets consisting of the monomer composition are attained to the desired particle size of the toner, granulation is stopped. It is kept the condition of the same particle size by the effect of the dispersion stabilizer, or gently stirred to prevent from sedimentation thereof. The polymerization reaction is carried out at 40 degrees centigrade at least, preferable at 50 to 90 degrees centigrade. In the latter of the polymerization reaction, it may be risen the temperature. In the latter of the polymerization reaction, or after the polymerization reaction, a part of the aqueous solvent may be distilled in order to remove together the unreacted monomer, byproducts and so on. In thus suspension polymerization method, it is preferable that 300 to 3000 parts by weight of water as the solvent for the dispersion are used to 100 parts by weight of the monomer composition.

After the polymerization reaction, the prepared toner particles are washed, filtrated out and dried, to obtain the polymerized toner.

An image formation process of electrophotography of the present invention comprises a step for developing the electrostatic latent image on the electrostatic latent image frame by a developer including the toner.

It is preferable that the image formation process of electrophotography may comprise steps of:

a step for absorbing developer that includes the toner for forming a layer thereof on developer-carrier frame which rotates at most 900 cm/min., that is for example arranged to an electrostatic latent image frame with an interstice:

the step for developing the electrostatic latent image by absorbing the toner in the layer on the electrostatic latent image frame.

As it is mentioned above in detail, the charge control agent of the present invention is fine and uniform shape, and unnecessary to pulverize using the jet mill and so on. It is manufactured simply. The charge control agent performs to quicken the rise speed of the electrification and electrify sufficiently. So the charge control agent is used for the toner for electrostatic image development with widespread purposes of the high or low speed copy. Further the charge control agent is used for the powder paint of the electrostatic powder painting. The charge control agent does not include toxic heavy metals, to have high safety, so that does not cause environmental pollution.

The toner for electrostatic image development comprising the charge control agent performs to quicken the rise speed of the electrification. The toner causes electrifying sufficient quantity of the negative charge and keeping stable electrification for a long period, because the charge control agent is dispersed homogeneously in the toner. The toner is used for the development of the electrostatic latent image under electro photography system. The images, that is formed by transferring the electrostatic latent image onto printing paper, have stability, vividness, high resolution and clearness without foggy.

BRIEF EXPLANATION OF THE DRAWINGS

FIG. 2 is a graph shown a correlation between rotation time and quantity of the frictional electrification using another toner for the electrostatic image development that applies this invention, under each rotation speed.

DETAILED EXPLANATION OF THE INVENTION

Figure 1:
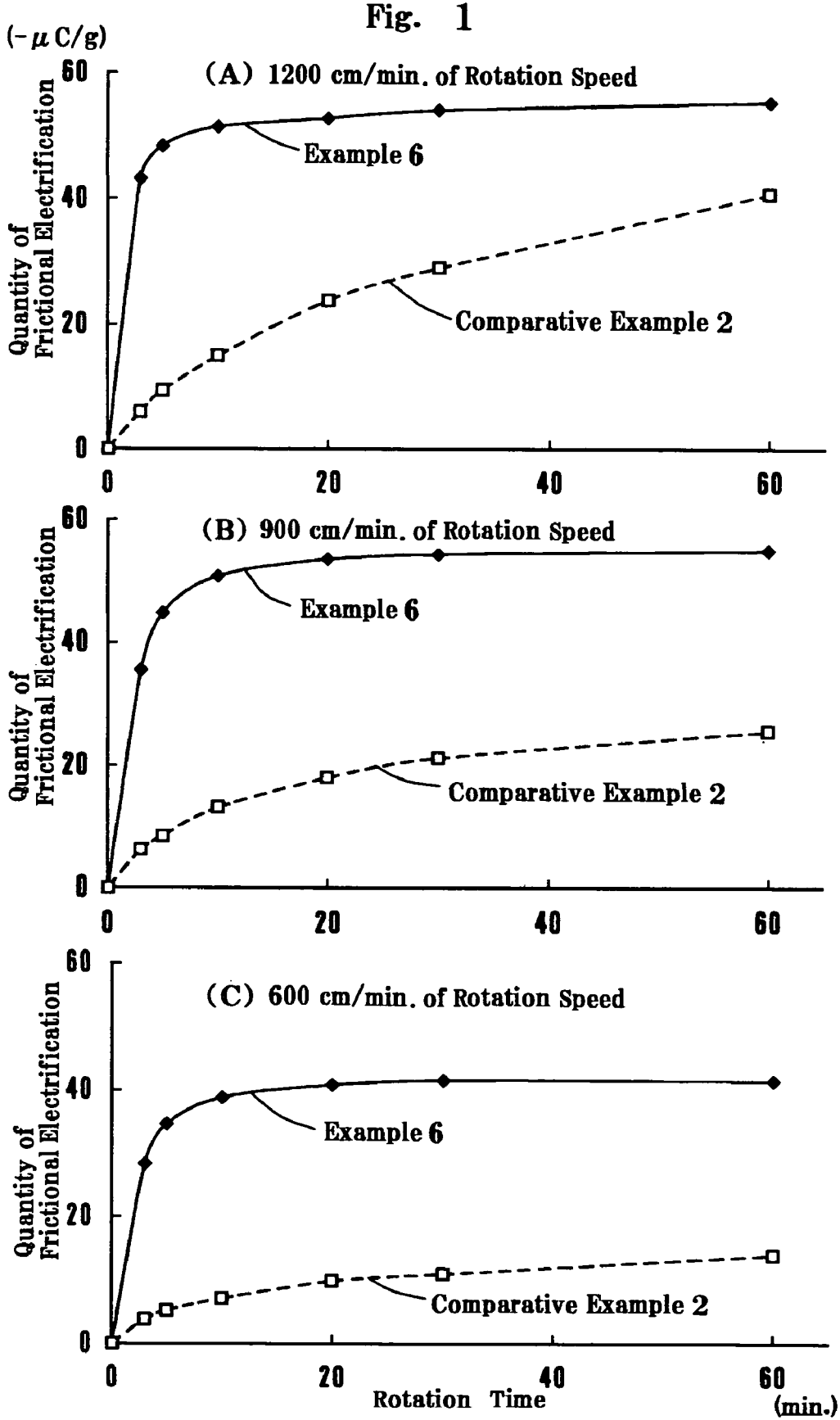
FIG. 1 is a graph shown a correlation between rotation time and quantity of the frictional electrification using the toner for the electrostatic image development that applies this invention, under each rotation speed.

Hereunder, embodiments of the charge control agent of this invention and the toner for developing the electrostatic image comprising thereof are explained in detail.

EXAMPLE 1

The method for manufacturing the charge control agent comprising the azo-type iron complex salt represented by the above chemical formula [II] is explained, referring to the following chemical reaction equations which is an example of synthesizing the complex salt.

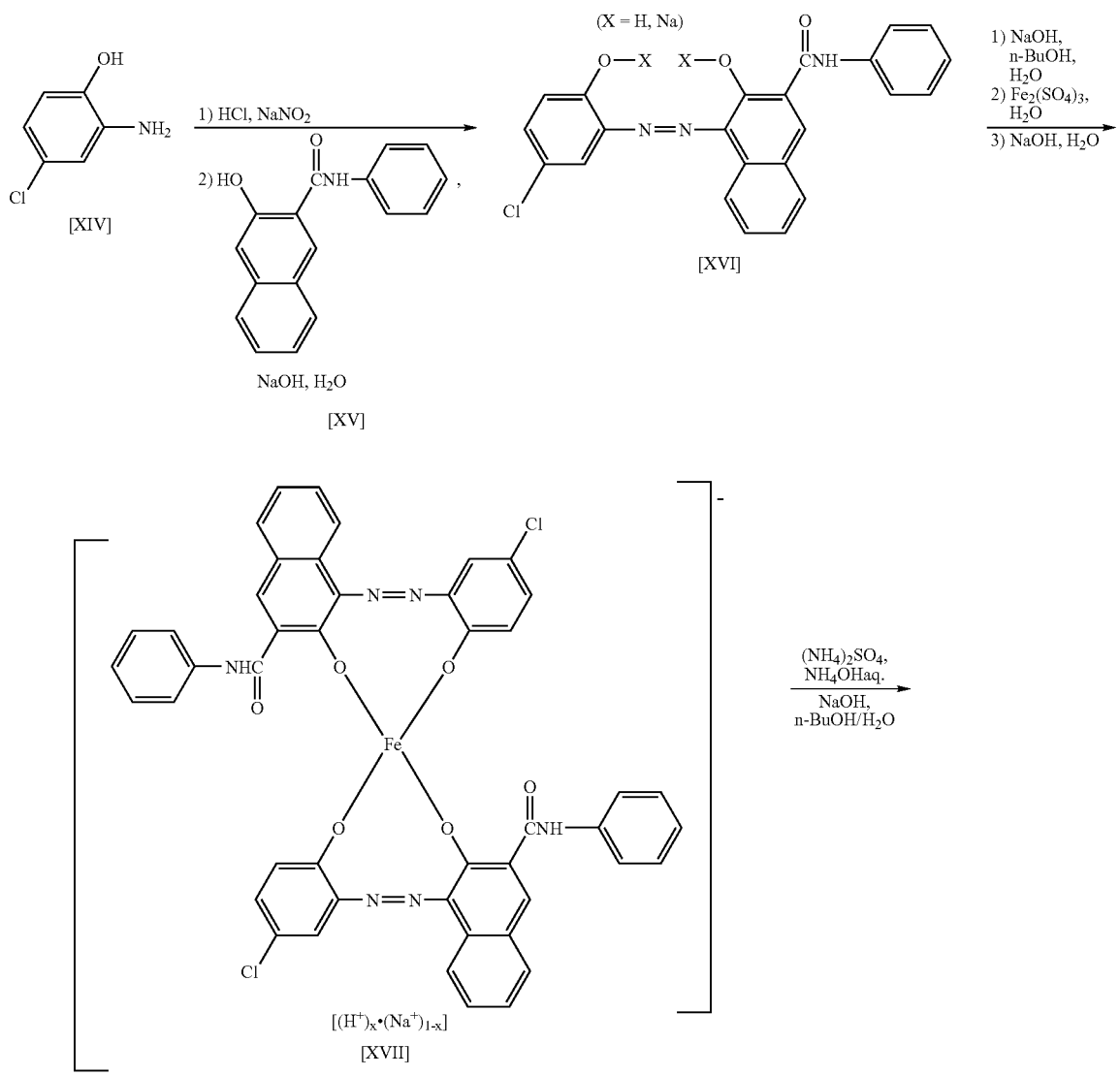

-continued

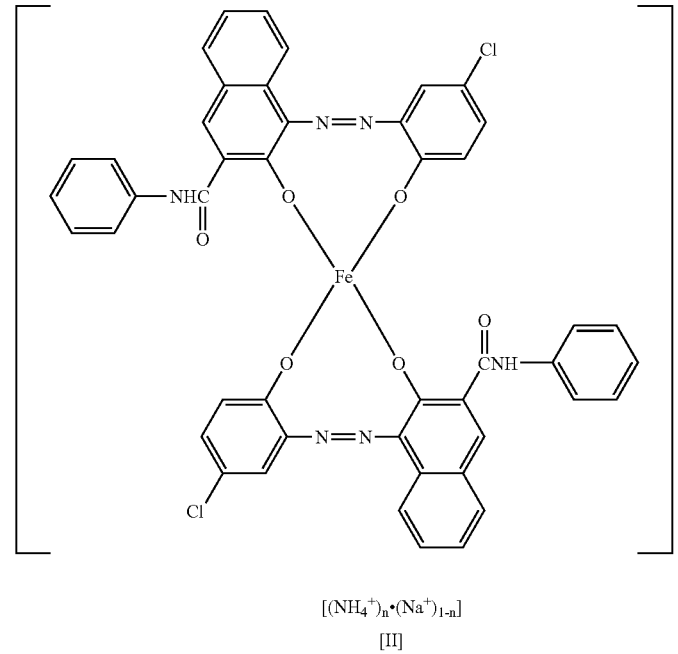

[(NH$_4^+$)$_n$•(Na$^+$)$_{1-n}$]

[II]

58.1 g of 2-amino-4-chlorophenol (chemical formula [XIV]) as a starting material and 120.0 g of concentrated hydrochloric acid were added to 680.3 g of water. For diazotization, 36.3 g of 36% sodium nitrite aqueous solution was added thereto gradually with cooling a reaction vessel by ice, to obtain the diazonium salt. The diazonium salt solution was added dropwise in a short time to aqueous solution of 17.4 g of Naphthol AS (chemical formula [XV]), 280 g of 20.5% sodium hydroxide aqueous solution and 800 mL of water, and then it was reacted for 2 hours. The precipitated monoazo compound (chemical formula [XVI]) was filtrated out and washed with water, to obtain 688.4 g of the wet coke having 78.4% of water content.

When a small part of the wet cake of the monoazo compound (chemical formula [XVI]) was dried and determined the amount of sodium by atomic absorption spectro photometry, the amount of sodium was 2.88%.

285.4 g of the wet cake of the monoazo compound (chemical formula [XVI]) was dispersed in the mixed solvent of 94.3 g of normal butanol and 1180 g of water. 25.0 g of 20.5% sodium hydroxide aqueous solution, that is regulating the amount of residual sodium thereof to converted solid weight of the wet cake, was added to the mixed solvent. It was heated at 80 degrees centigrade, and stirred to disperse for 30 minutes. Then 36.0 g of 41% ferric sulfate aqueous solution was added dropwise. It was heated at 96 degrees centigrade, and refluxed for 2 hours, to prepare the azo-type iron complex salt including hydrogen ion (chemical formula [XVII]). Further it was refluxed, 126.9 g of the water and normal butanol were removed using Dean-Stark traps. After cooling until room temperature, 19.4 g of ammonium sulfate and 20.0 g of 25% aqueous ammonia were added. Then it was refluxed for 2 hours at 96 degrees centigrade, to exchange the counter ion. After the reaction, it was cooled. The precipitated azo-type iron complex salt (chemical formula [II]) was filtrated out and washed with water, to obtain 57.3 g of the desired charge control agent.

It was dried, to form aggregated lumps of 1 mm to several cm. The lumps were crushed with the agitator mill or mashed with the mortar, to be powdery.

The charge control agent was analyzed chemically and evaluated physically.

(The Observation by the Scanning Electron Microscope)

The charge control agent was observed the particle size and the shape using the scanning electron microscope S2350 that is available from Hitachi, Ltd. When the charge control agent was magnified, it was observed that the size of the primary particulate was 1 to 4 microns and the shape was almost uniform platy-shape.

(The Measurement of the Average Particle Size of the Aggregate Particles of the Charge Control Agent)

20 mg of the charge control agent was added to solution of 20 mL of water and 2 mL of an activator: scourol 100 that is available from Kao Corporation, to prepare mixture. About 1 mL of the mixture was add to 120 mL of dispersed water in particle size distribution measurement equipment LA-910 that is available from Horiba, Ltd. After it was irradiated with the ultrasonic wave for 1 minute, the particle size distribution was measured. The average particle size of the aggregate particles of the charge control agent was 2.2 microns.

(The Average Article Size of the Primary Particulate Crystalline, which the Charge Control Agent was Dispersed Finely)

20 mg of the aggregate particles of the charge control agent was added to solution of 20 mL of water and 2 mL of the activator: scourol 100 that is available from Kao Corporation, to prepare mixture. The mixture was irradiated with the ultrasonic wave for 10 minutes. 1 or 2 droplets of the mixture were added to 120 mL of dispersed water in the particle size distribution measurement equipment LA-910 that is available from Horiba, Ltd. After it was irradiated with the ultrasonic wave for further 1 minute, to disperse the aggregate particles finely until to be the primary particulate crystalline, the particle size distribution was measured. When the result with the measured particle size distribution differs from the result with the observed particle size by the scanning electron microscope awfully, it was irradiated with the ultrasonic wave for further 5 minutes to disperse the aggregate particles more finely until to be the primary particulate crystalline and measured the particle size distribution again. The average particle size of the primary particulate crystalline of the charge control agent was 1.6 microns.

(The Measurement of the Specific Surface Area of the Charge Control Agent)

The specific surface area of the charge control agent, that is B.E.T., was measured using specific surface area measurement equipment NOVA-1200 that is available from QUANTACHROME Corporation. After an empty large-cell having 9 mm of the length was weighed, about 0.2 g of the charge control agent was put in to 4/5 of the cell. The cell was set in a drying chamber and heated at 120 degrees centigrade for 1 hour, to degas. The cell was cooled and weighed, to calculate the weight of the charge control agent. The cell was set on the analysis station, to measure. The specific surface area of the primary particulate crystalline determined from the average particle size was 15.3 m$^2$/g.

(The Measurement of the Amount of Ammonium Ion and the Amount of Sodium Ion)

The including amount of sodium of the charge control agent et cetera were measured using atomic absorption spectro photometer AA-660 that is available from Shimadzu Corporation, and elementary analyzer 2400 II CHNS/O that is available from Perkin Elmer Instruments. As the ratio of the counter ions, the ammonium ion was 97.2 mol % and sodium ion was 2.8 mol %.

(Measurement of the Amount of Residual Chloride Ion and the Amount of Residual Sulfate Ion)

The amount of residual chloride ion and the amount of residual sulfate ion of the charge control agent were measured using ion exchange chromatograph DX-300 that is available from DIONEX Corporation. The amount of residual chloride ion was 112 ppm. The amount of residual sulfate ion was below a limit of the detection that was 100 ppm.

(Measurement of the Amount of the Organic Solvent)

The amount of the organic solvent of the charge control agent was measured using gas chromatograph SERIES II 5890 that is available from HEWLETT-PACKARD Company. The amount of normal butanol was 0.22% by weight.

These results are shown in Table 1.

EXAMPLE 2

As another lot of the monoazo compound (chemical formula [XVI]) with the same procedure as Example 1, wherein the obtained amount differs, was prepared. The precipitated monoazo compound was filtrated out and washed with water, to obtain 1620.4 g of the wet cake having 73.8% of water content.

When a small part of the monoazo compound (chemical formula [XVI]) was dried and determined the amount of sodium by atomic absorption spectro photometry, the amount of sodium was 1.90%.

160 g of the wet cake of the monoazo compound (chemical formula [XVI]) was dispersed in the mixed solvent of 22.2 g of normal butanol and 283.39 g of water. 22.05 g of 20.5% sodium hydroxide aqueous solution, that is regulating the amount of residual sodium thereof to converted solid weight of the wet cake, was added to the mixed solvent. It was heated at 80 degrees centigrade, and stirred to disperse for 30 minutes. Then 24.5 g of 41% ferric sulfate aqueous solution was added dropwise. It was heated at 93 degrees centigrade, and refluxed for 2 hours, to prepare the azo-type iron complex salt including hydrogen ion (chemical formula [XVII]). Further it was refluxed, 34.3 g of the water and normal butanol were removed using Dean-Stark traps. After cooling until room temperature, 3.32 g of ammonium sulfate and 13.65 g of 25% aqueous ammonia were added. Then it was refluxed for 2 hours at 96 degrees centigrade, to exchange the counter ion. After the reaction, it was cooled. The precipitated azo-type iron complex salt (chemical formula [II]) was filtrated out and washed with water, to obtain 38.7 g of the desired charge control agent.

It was dried, to form aggregated lumps of 1 mm to several cm. The lumps were crushed with the agitator mill or mashed with the mortar, to be powdery.

The charge control agent was analyzed chemically and evaluated physically as the same as Example 1. When the charge control agent was observed using the scanning electron microscope, it was observed that the size of the primary particulate was within the range of 1 to 4 microns and the shape was almost uniform platy-shape. The average particle size of the aggregate particles of the charge control agent was 3.5 microns. The average particle size of the primary particulate crystalline, that the charge control agent was dispersed finely, was 1.8 microns. These results of the charge control agent of Example 2, that is analyzed chemically and evaluated physically, are shown in Table 1 together.

EXAMPLE 3

As another lot of the monoazo compound (chemical formula [XVI]) with the same procedure as Example 1, wherein the water content differs, was prepared. The precipitated monoazo compound was filtrated out and washed with water, to obtain the wet cake that had 68.45% of water content and was 99.00% of purity measured by liquid chromatography. When a small part of the wet cake of the monoazo compound was dried and determined the amount of sodium by atomic absorption spectro photometry, the amount of sodium was 4.26%.

70.0 g of the wet cake of the monoazo compound was dispersed in the mixed solvent of 11.53 g of 1-pentanol and 424.27 g of water. 7.1 g of 20.5% sodium hydroxide aqueous solution, that is regulating the amount of residual sodium thereof to converted solid weight of the wet cake, was added to the mixed solvent. It was heated at 80 degrees centigrade, and stirred to disperse for 30 minutes. Then 12.76 g of 41% ferric sulfate aqueous solution was added dropwise. At this point, pH of the reaction mixture was 2.7. It was heated at 97 degrees centigrade, and refluxed for 3 hours, to prepare the azo-type iron complex salt. The precipitated azo-type iron complex salt was filtrated out and washed with water, to obtain 53.4 g of the wet cake having 60.3% of water content.

The wet cake was dispersed in 151 g of water. 1.5 g of ammonium sulfate, 6.1 g of 25% aqueous ammonia and 5.5 g of normal butanol were added thereto. It was heated at 97 degrees centigrade and refluxed for 2 hours to exchange the counter ion. The precipitated azo-type iron complex salt was filtrated out, washed with water and dried, to obtain 19.5 g of the desired charge control agent.

The charge control agent was analyzed chemically and evaluated physically as the some as Example 1. The average particle size of the aggregate particles of the charge control agent was 4.0 microns. The average particle size of the primary particulate crystalline, that the charge control agent was dispersed finely, was 2.1 microns. These results of the charge control agent of Example 3, that is analyzed chemically and evaluated physically, are shown in Table 1 together.

EXAMPLE 4

The monoazo compound salt represented by the following chemical formula [XVIII] was prepared as the same as Example 1, except for using 2-amino-4-sulfonamido derivative instead of 2-amino-4-chlorophenol (chemical formula [XIV]).

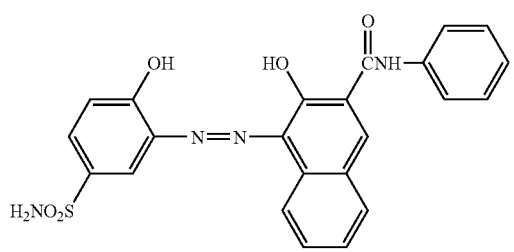

[XVIII]

The precipitated monoazo compound was filtrated out and washed with water, to obtain the wet cake that had 58.3% of water content and was 97.04% of purity measured by liquid chromatography. When a small part of the wet cake of the monoazo compound was dried and determined the amount of sodium by atomic absorption spectro photometry, the amount of sodium was 4.20%.

57.00 g of the wet cake of the monoazo compound, that is 0.050 mol, was dispersed in the mixed solvent of 24.24 g of normal butanol and 409.02 g of water. 9.37 g of 20.5% sodium hydroxide aqueous solution, that is 0.048 mol and is regulating the amount of residual sodium thereof to converted solid weight of the wet cake, was added to the mixed solvent. It was heated at 80 degrees centigrade, and stirred to disperse for 30 minutes. Then 12.24 g of 41% ferric sulfate aqueous solution, that was 0.013 mol, was added dropwise. At this point, pH of the reaction mixture was 3.83. It was heated at 97 degrees centigrade, and refluxed for 3 hours, to prepare the azo-type iron complex salt. The precipitated azo-type iron complex salt was filtrated out and washed with water, to obtain 50.05 g of the wet cake having 56.3% of water content.

The wet cake was dispersed in 161 g of water. 1.6 g of ammonium sulfate, 6.3 g of 25% aqueous ammonia and 5.7 g of butanol were added thereto. It was heated at 97 degrees centigrade and refluxed for 2 hours to exchange the counter ion. The precipitated azo-type iron complex salt (chemical formula [VII]) was filtrated out, washed with water and dried, to obtain 21.1 g of the desired charge control agent.

The charge control agent was analyzed chemically and evaluated physically as the same as Example 1. When the charge control agent was observed using the scanning electron microscope, it was observed that the size of the primary particulate was within the range of 1 to 4 microns and the shape was almost uniform platy-shape. The average particle size of the aggregate particles of the charge control agent was 3.9 microns. The average particle size of the primary particulate crystalline, that the charge control agent was dispersed finely, was 1.7 microns. These results of the charge control agent of Example 4, that is analyzed chemically and evaluated physically, are shown in Table 1 together.

EXAMPLE 5

16.2 g of 2-amino-4-chlorophenol (chemical formula [XIV]) as a starting material and 26.1 g of concentrated hydrochloric acid were added to 124.0 g of water. For diazotization, 21.7 g of 36% sodium nitrite aqueous solution was added thereto gradually with cooling the reaction vessel by ice, to obtain the diazonium salt. The diazonium salt solution was added dropwise in a short time to aqueous solution of 25.0 g of Naphthol AS (chemical formula [XV]), 55.9 g of 20.5% sodium hydroxide aqueous solution and 186 mL of water, then it was reacted for 2 hours, to obtain the reaction mixture including the precipitated monoazo compound (chemical formula [XVI]). 12.0 g of butanol, 18.2 g of 20.5% sodium hydroxide aqueous solution and 22.7 g of 41% ferric sulfate aqueous solution were added to the reaction mixture. It was heated at 97 degrees centigrade, and refluxed for 2 hours, to prepare the azo-type iron complex salt (chemical formula [XVII]). The precipitated azo-type iron complex salt (chemical formula [XVII]) was filtrated out and washed with water, to obtain 86.63 g of wet cake having 55.1% of water content.

The wet cake was dispersed in 282 g of water. 3.00 g of ammonium sulfate, 11.0 g of 25% aqueous ammonia and 9.9 g of butanol were added thereto. It was heated at 97 degrees centigrade and refluxed for 2 hours to exchange the counter ion. The precipitated azo-type iron complex salt (chemical formula [II]) was filtrated out, washed with water and dried, to obtain 34.9 g of the desired charge control agent.

The charge control agent was analyzed chemically and evaluated physically as the same as Example 1. The average particle size of the aggregate particles of the charge control agent was 3.9 microns. The average particle size of the primary particulate crystalline, that the charge control agent was dispersed finely, was 2.0 microns. These results of the charge control agent of Example 5, that is analyzed chemically and evaluated physically, are shown in Table 1 together.

COMPARATIVE EXAMPLE 1

The wet cake of the monoazo compound salt (chemical formula [XVI]), that is the intermediate, was prepared as the same as Example 1.

285.4 g of the wet cake of the monoazo compound (chemical formula [XVI]) was dispersed in 1180 g of water. 25.0 g of 20.5% sodium hydroxide aqueous solution, that is regulating the amount of residual sodium thereof to converted solid weight of the wet cake, was added to the mixed solvent. It was heated at 80 degrees centigrade, and stirred to disperse for 30 minutes. Then 36.0 g of 41% ferric sulfate aqueous solution was added dropwise. It was heated at 85 degrees centigrade, and refluxed for 2 hours, to prepare the azo-type iron complex salt (chemical formula [XVII]). The yield of the azo-type iron complex salt was 19.3%. When the azo-type iron complex salt was magnified, it was observed that crystal form was ununiform and lumps.

The charge control agent was analyzed chemically and evaluated physically as the same as Example 1. The average particle size of the aggregate was 22.4 microns. When it was observed using the scanning electron microscope, it was observed that the particle size was 40 microns at most. These results of the charge control agent of Comparative Example 1, that is analyzed chemically and evaluated physically, are shown in Table 1 together.

5 weight parts of the toner and 95 weight parts of iron powder carrier TEFV200/300 that is available from Powder Tech Corporation were loaded in three drums respectively. The developing rollers confronted thereof were rotated at rotation speed of (A) 1200 cm/minuets, (B) 900 cm/minuets, and (C) 600 cm/minuets. The quantity of the frictional electrification of the toner with passage of time was determined by blow-off method using an instrument TB-200, that the blow-off measuring instrument of the quantity of the electrification is available from Toshiba Chemical Corporation. The results are shown in (A) to (C) of FIG. 1.

EXAMPLE 7

The black toner was prepared as the same as Example 6, except for using the charge control agent of Example 4 instead of the charge control agent of Example 1. The quantity of the frictional electrification was determined by blow-off method. The result are shown in (A) to (C) of FIG. 2.

EXAMPLE 8

After 450 weight parts of 0.1 mol/L $Na_3PO_4$ aqueous solution was added to 710 weight parts of deionized water, it was heated at 60 degrees centigrade. Stirring by 5000 rpm

TABLE 1

| Evaluation Criteria | | Example 1 | Example 2 | Example 3 | Example 4 | Example 5 | comparative Example 1 |
|---|---|---|---|---|---|---|---|
| Average Particle Size (micron) | Aggregate Particle | 2.2 | 3.5 | 4.0 | 3.9 | 3.9 | 22.4 |
| | Primary Particle | 1.6 | 1.8 | 2.1 | 1.7 | 2.0 | 14.8 |
| Mol Ratio of Counter Ion (mol %) | $Na^+$ | 2.8 | 7.5 | 15.8 | 26.8 | 21.7 | 100 |
| | $NH_4^+$ | 97.2 | 92.5 | 84.2 | 73.2 | 78.3 | 0 |
| Amount of Residual Chloride Ion | (ppm) | 112 | Below Limit of Detection | 147 | Below Limit of Detection | Below Limit of Detection | 115 |
| Amount of Residual Sulfate Ion | (ppm) | Below Limit of Detection | Below Limit of Detection | Below Limit of Detection | Below Limit of Detection | Below Limit of Detection | 2070 |

Hereunder, examples of preparing the toner for developing the electrostatic image using the charge control agent are explained.

EXAMPLE 6

1 weight part of the charge control agent prepared in Example 1,
100 weight parts of stylene-acrylic copolymer CPR-600B that is available from Mitsui Chemicals, Inc.,
6 weight parts of carbon black MA-100 that is available from Mitsubishi Chemical Corporation, and
2 weight parts of low-grade polypropylene VISCOL 550P that is available from Sanyo Kasei Industries, Ltd. were mixed beforehand, to prepare a pre-mix. The pre-mix was melted and kneaded. After cooling, it was pulverized coarsely by an ultra-centrifugal pulverizing machine. The obtained coarse pulverulent was fined using an air jet mill attached a classifier, to obtain the black toner having 5 to 15 microns of particle size.

using T.K. HOMO MIXER that is available from Tokushu Kika Kogyo Co., Ltd., 68 weight parts of 1.0 mol/L $CaCl_2$ aqueous solution was added gradually, to prepare water dispersed $Ca(PO_4)_2$.

The other hand, 170 weight parts of styrene monomer, 25 weight parts of carbon, 4 weight parts of the dispersed solution, and 9 weight parts of the azo-type iron complex salt (chemical formula [II]) of Example 1 were added to DYNO-MILL ECM-PIROT that is available from Shinmaru Enterprises Corporation. It was stirred to disperse with 0.8 mm of zirconia beads using a stirring blade at 10 m/sec. of peripheral speed for 3 hours, to obtain the dispersed solution. 10 weight parts of 2,2-azobis(2,4-dimethylvaleronitrile) was added to the dispersed solution at 60 degrees centigrade, to prepare the monomer composition.

The monomer composition was added to the water dispersed $Ca(PO_4)_2$. It was stirred at 10000 rpm for 15 minuets, to granulate. Then it was stirred using the stirring blade at 80 degrees centigrade for 10 hours, to polymerize. After the reaction, the unreacted monomer was removed under reduced pressure. After cooling, hydrochloric acid was added to dissolved $Ca(PO_4)_2$. It was filtrated, washed with water, and dried, to obtain the black toner.

5 weight parts of the black toner and 95 weight parts of ferrite carrier were mixed, to obtain the developer. Under the environment of the temperature of 26 to 29 degrees centigrade and the humidity of 55 to 63%, the images were formed using the developer. According to endurance test that is formed images onto 5000 pieces of paper, the initial and final of the images had the same density, high quality, and, no printing except inside.

COMPARATIVE EXAMPLE 2

The toner of Comparative Example was prepared as the same as Example 6 except for using the charge control agent of Comparative Example 1. The quantity of the frictional electrification of the toner was determined as the same. The result are shown in (A) to (C) of FIG. 1 and FIG. 2.

It was evidence with FIG. 1 and FIG. 2 that the toner of Examples had the fast rise speed of the electrification and the sufficient quantity of the electrification, not only under high rotating speed but also under low rotating speed.

What is claimed is:

1. A toner for developing an electrostatic image comprising:
   a resin for the toner, and
   a charge control agent comprising aggregate particles of an azo-type iron complex salt represented by the following chemical formula [I]:

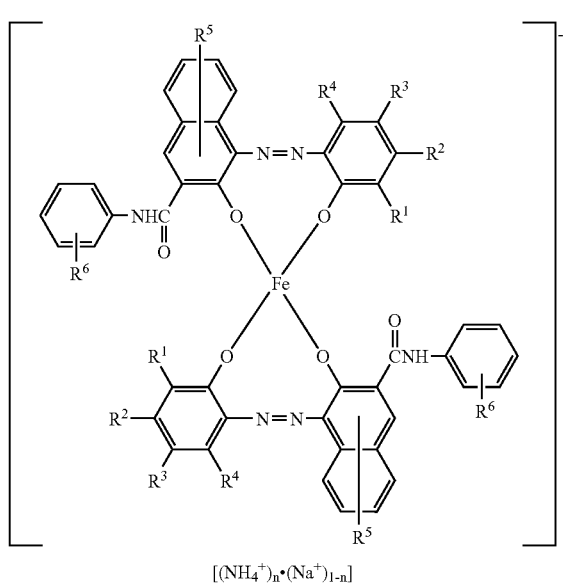

wherein $R^{1-}$, $R^{2-}$, $R^{3-}$, and $R^{4-}$ are the same or different and selected from the group consisting of a hydrogen atom, an alkyl group having a straight or branch chain of 1 to 18 carbon atoms, an alkenyl group having a straight to branched chain of 2 to 18 carbon atoms, a sulfonamide group being to have substitutional groups, a mesyl group, a hydroxyl group, an alkoxyl group of 1 to 18 carbon atoms, an acetylamino group, a benzoylamino group, a halogen atom, a nitro group and an aryl group being to have substitutional groups; $R^{5-}$ is a hydrogen atom, an alkyl group having a straight or branched chain of 1 to 18 carbon atoms, a hydroxyl group or an alkoxyl group of 1 to 18 carbon atoms; $R^{6-}$ is a hydrogen atom, an alkyl group having a straight or branched chain of 1 to 18 carbon atoms, a hydroxyl, group, a carboxyl group, a halogen atom, or an alkoxyl group of 1 to 18 carbon atoms; and n is 0.7 to 0.99,
said aggregate particles have an average size of 1 to 4 microns and an average particle size of a primary particulate crystalline that is formed by fining the aggregate particles with ultrasonic irradiation, is at most 3 microns.

2. The toner according to claim 1, wherein the primary particulate crystalline of said azo-type iron complex salt has a size of at most 4 microns.

3. The toner according to claim 1, wherein said azo-type iron complex salt is represented by the following chemical formula [II]

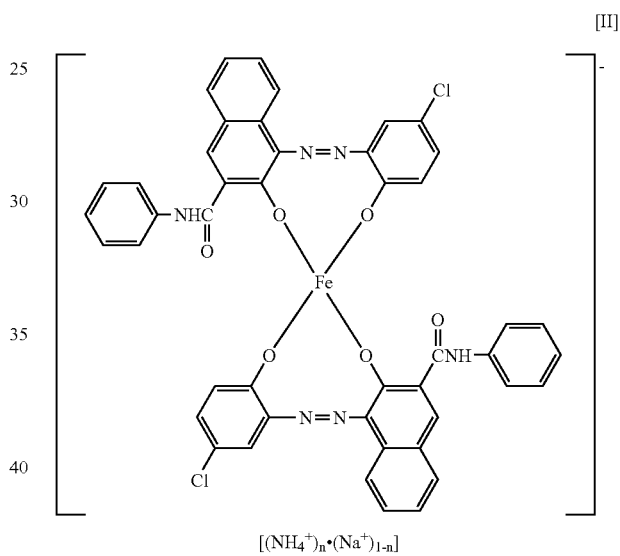

4. The toner according to claim 1 wherein said aggregate particles of the azo-type iron complex salt have an almost uniform platy-shape.

5. The toner according to claim 1, wherein a specific surface area determined from said average particle size of the primary particulate crystalline is at least $10m^2/g$.

6. The toner according to claim 1, wherein allowable residual sulfate ion in the charge control agent is at most 100ppm and allowable residual chloride ion in the charge control agent is at most 200ppm.

7. The toner according to claim 1, further comprising butanol of an amount of 0.01 to 1.00% by weight.

8. An image formation process of eletrophotography comprising the steps of:
   developing an electrostatic latent image on an electrostatic latent image frame by a developer including a toner, said toner comprising a resin for the toner and a charge control agent comprising aggregate particles of an azo-type iron complex salt represented by the following chemical formula [I]

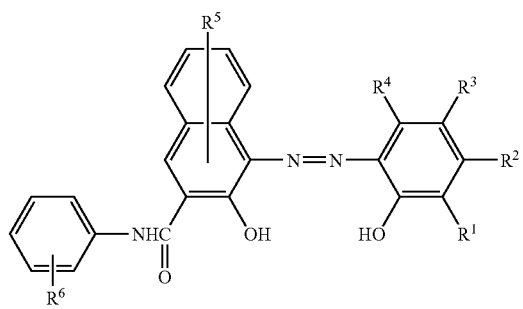

wherein $R^{1-}$, $R^{2-}$, $R^{3-}$, and $R^{4-}$ are the same or different and selected from the group consisting of a hydrogen atom, an alkyl group having a straight or branched chain of 1 to 18 carbon atoms, an alkenyl group having a straight to branched chain of 2 to 18 carbon atoms, a sulfonamide group being to have substitutional groups, a mesyl group, a hydroxyl group, an alkoxyl group of 1 to 18 carbon atoms, an acetylamino group, a benzoylamino group, a halogen atom, a nitro group and an aryl group being to have substitutional groups; $R^{5-}$ is a hydrogen atom, an alkyl group having a straight or branched chain of 1 to 18 carbon atoms, a hydroxyl group or an alkoxyl group of 1 to 18 carbon atoms; $R^{6-}$ is a hydrogen atom, an alkyl group having a straight or branched chain of 1 to 18 carbon atoms, a hydroxyl, group, a carboxyl group, a halogen atom, or an alkoxyl group of 1 to 18 carbon atoms; and n is 0.7 to 0.99, that said aggregate particles have an average size of 1 to 4 microns and an average particle size of a primary particulate crystalline, that is formed by fining the aggregate particles with ultrasonic irradiation, is at most 3 microns.

9. The image formation process according to claim 8, wherein the primary particulate crystalline of said azo-type iron complex salt has a size of at most 4 microns.

10. The image formation process according to claim 8, wherein said azo-type iron complex salt is represented by the following chemical formula [II]

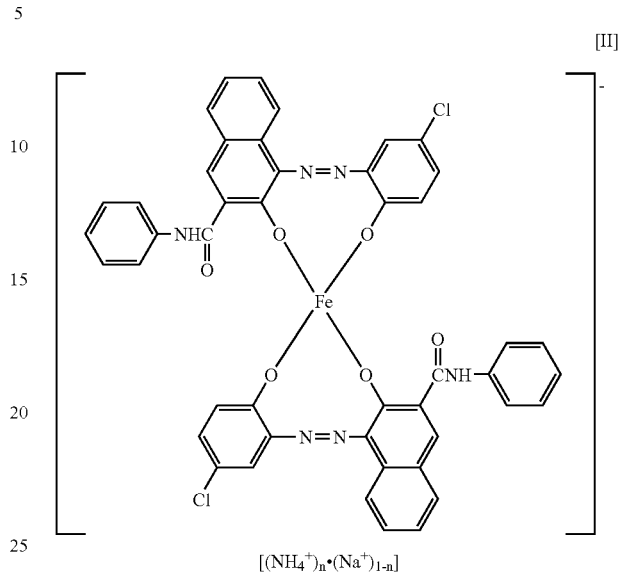

11. The image formation process according to clam 8, further comprising:

absorbing developer that is included in the toner for forming a layer thereof on a developer-carrier frame that rotates at most 900 cm/min:

the step for developing the electrostatic latent image by absorbing the toner in the layer on a electrostatic latent image frame.

\* \* \* \* \*